(12) United States Patent
Yang (10) Patent No.: US 11,509,847 B2
(45) Date of Patent: Nov. 22, 2022

(54) IMAGE SENSING SYSTEM AND ELECTRONIC DEVICE OPERATING IN OPTICAL RANGING MODE AND GENERAL CAMERA MODE AT THE SAME TIME

(71) Applicant: SHENZHEN GOODIX TECHNOLOGY CO., LTD., Guangdong (CN)

(72) Inventor: Meng-Ta Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 419 days.

(21) Appl. No.: 16/669,147

(22) Filed: Oct. 30, 2019

(65) Prior Publication Data

US 2020/0068153 A1    Feb. 27, 2020

Related U.S. Application Data

(63) Continuation of application No. PCT/CN2018/083211, filed on Apr. 16, 2018.

(51) Int. Cl.
*H04N 5/369* (2011.01)
*G01S 17/86* (2020.01)
*G01S 17/10* (2020.01)

(52) U.S. Cl.
CPC ......... *H04N 5/36965* (2018.08); *G01S 17/10* (2013.01); *G01S 17/86* (2020.01)

(58) Field of Classification Search
CPC ...... H04N 5/36965; G01S 17/86; G01S 17/10
USPC ....................................................... 348/294
See application file for complete search history.

(56) References Cited

U.S. PATENT DOCUMENTS

| 2004/0036009 A1* | 2/2004 | Takayanagi ....... H01L 27/14603 |
| | | 348/E5.081 |
| 2006/0138489 A1 | 6/2006 | Ahn et al. |
| 2008/0197388 A1 | 8/2008 | Park et al. |
| 2010/0308213 A1* | 12/2010 | Romero ............ H01L 27/14612 |
| | | 257/225 |
| 2011/0261191 A1 | 10/2011 | Byren et al. |

(Continued)

FOREIGN PATENT DOCUMENTS

| CN | 1496112 A | 5/2004 |
| CN | 1817027 A | 8/2006 |

(Continued)

OTHER PUBLICATIONS

English Abstract of CN101931021A.

(Continued)

*Primary Examiner* — Usman A Khan
(74) *Attorney, Agent, or Firm* — WPAT, P.C., Intellectual Property Attorneys; Anthony King (57) ABSTRACT

The present invention provides an image sensing system (10), including a first pixel circuit (120), wherein the first pixel circuit includes a photosensitive device (PD); a first transmission gate (TG1), under the control of a first transmission signal and conducted during a first conduction time interval; and a collection gate (CG), coupled between the photosensitive device and the transmission gate and configured to receive a collecting signal (CX); and a control unit (14), configured to generate the collecting signal to the collection gate, wherein the collecting signal has a non-fixed voltage value.

18 Claims, 10 Drawing Sheets

(56) References Cited

U.S. PATENT DOCUMENTS

| | | | |
|---|---|---|---|
| 2011/0291164 A1 | 12/2011 | Bamji et al. | |
| 2012/0038904 A1 | 2/2012 | Fossum et al. | |
| 2013/0020463 A1* | 1/2013 | Lee | H04N 5/36965 250/206 |
| 2014/0145789 A1* | 5/2014 | Sugimoto | H03F 3/087 330/252 |
| 2014/0198183 A1* | 7/2014 | Kim | G01S 17/894 250/214 R |
| 2016/0197118 A1 | 7/2016 | Park et al. | |
| 2016/0197585 A1* | 7/2016 | Oku | H03F 3/45103 330/291 |
| 2016/0216376 A1 | 7/2016 | Patil | |
| 2018/0098012 A1* | 4/2018 | Takado | H04N 5/3577 |

FOREIGN PATENT DOCUMENTS

| | | |
|---|---|---|
| CN | 101784911 A | 7/2010 |
| CN | 101931021 A | 12/2010 |
| CN | 102112844 A | 6/2011 |
| CN | 102595050 A | 7/2012 |
| CN | 102714702 A | 10/2012 |
| CN | 103155150 A | 6/2013 |
| CN | 103972258 A | 8/2014 |
| CN | 104853113 A | 8/2015 |
| CN | 106471391 A | 3/2017 |
| CN | 106954008 A | 7/2017 |
| CN | 107223276 A | 9/2017 |
| CN | 107251120 A | 10/2017 |
| CN | 107490370 A | 12/2017 |
| CN | 107637071 A | 1/2018 |
| CN | 107690565 A | 2/2018 |
| CN | 107888903 A | 4/2018 |
| CN | 107888903 A | 4/2018 |
| DE | 102014214733 B3 | 7/2015 |
| EP | 2296368 A1 | 3/2011 |
| EP | 2405663 A1 | 1/2012 |
| WO | 2013015854 A1 | 1/2013 |
| WO | 2016133053 A1 | 8/2016 |
| WO | 2017082093 A1 | 5/2017 |
| WO | WO2017082093 A1 | 5/2017 |
| WO | WO2019200513 A1 | 10/2019 |

OTHER PUBLICATIONS

English Abstract of CN102595050A.
English Abstract of CN107223276A.
English Abstract of CN107690565A.
Yuan Dejun, Wang Can, Chen Hao, Zheng Lixia, Sun Weifeng, "Design and implementation of GM-APD array readout circuit for infrared imaging", Journal of Southeast University (English Edition) vol. 32, No. 1, pp. 11-15, Mar. 2016 ISSN 1003-7985.
Zhao Jiaheng, Zhao Yiqiang, Ye Mao, Xia Xianzhao, Zhou Guoqing, "High precision pixel readout circuit design for GM-APD array", Infrared and Laser Engineering, vol. 46 No.1, Jan. 2017, p. 0106007-1 ~0106007-8.
English Abstract of CN1496112A.
English Abstract of CN 1817027A.
English Abstract of CN101784911A.
English Abstract of CN102112844A.
English Abstract of CN102714702A.
English Abstract of CN103155150A.
English Abstract of CN103972258A.
English Abstract of CN 104853113A.
English Abstract of CN106471391A.
English Abstract of CN106954008A.
English Abstract of CN107251120A.
English Abstract of CN107490370A.
English Abstract of CN107637071A.
English Abstract of CN107888903A.
English Abstract of DE102014214733B3.
International Search Report in Chinese for (Form PCT/ISA/210).
English Abstract Translation of Foreign Reference CN107888903A.
English Abstract Translation of Foreign Reference WO2017082093A1.
Andrian Driewer, Bedrich J. Hosticka, Andreas Spickermann, and Holger Vogt, "Modeling of CMOS Image Sensors for Time-of-Flight Applications", Proceedings vol. 9506, Optical Sensors 2015; 950603 (2015). Event: SPIE Optics + Optoelectronics, 2015, Prague, Czech Republic.

\* cited by examiner

FIG. 10

IMAGE SENSING SYSTEM AND ELECTRONIC DEVICE OPERATING IN OPTICAL RANGING MODE AND GENERAL CAMERA MODE AT THE SAME TIME

CROSS REFERENCE TO RELATED APPLICATIONS

The present application is a continuation of international application No. PCT/CN2018/083211, filed on Apr. 16, 2018, which is hereby incorporated by reference in its entirety.

TECHNICAL FIELD

The present application is related to an image sensing system and electronic device; in particular, to an image sensing system and electronic device capable of operating in an optical ranging mode and general camera mode at the same time.

BACKGROUND

With the rapid development of science and technology, the acquisition of the three-dimensional (3D) information of an object has a wide variety of application voltage level in many application fields, such as production automation, human-machine interaction, medical diagnosis, reverse engineering, digital modeling, etc. The structured light 3D measurement is a contactless 3D information acquisition technique, and has been widely used because of advantages such as easy-to-implement, fast speed and high accuracy.

When an image sensing system performs the optical ranging, the incident light emitted by the image sensing system is usually short pulsed light, and the collection gate in the pixel circuit of the current image sensing system receives a fixed voltage. However, when the collecting voltage is fixed, the full well capacity of the photosensitive device in the current pixel circuit is lower, which is disadvantageous to long term exposure, and hence, such pixel circuit is not suitable to operate in the general camera mode. Therefore, in the existing art, the electronic device needs a set of pixel array for operating in the general camera mode and another set of pixel array for operating in the optical ranging mode, thereby resulting in the increase in the manufacturing cost.

In view of the foregoing, there exists a need in the related art for further improvement.

BRIEF SUMMARY OF THE INVENTION

In view of the foregoing, the purpose of some embodiments of the present invention is to provide an image sensing system and electronic device capable of operating in an optical ranging mode and general camera mode at the same time, so as to address the disadvantages in the existing art.

To address the above-mentioned technical issues, embodiments of the present invention provides an image sensing system, which includes a first pixel circuit that includes a photosensitive device, a first transmission gate that is under the control of a first transmission signal and conducted during a first conduction time interval, and a collection gate that is coupled between the photosensitive device and the transmission gate and configured to receive a collecting signal; and a control unit, coupled to the collection gate and configured to generate the collecting signal to the collection gate, wherein the collecting signal has a non-fixed voltage value.

For example, before the first conduction time interval, the collecting signal generated by the control unit has a first high voltage level, and during the first conduction time interval, the collecting signal generated by the control unit transits from the first high voltage level into a low voltage level.

For example, the first transmission signal has a first rising edge at a first rising edge time, and the collecting signal transits from the first high voltage level into the low voltage level at first transition time, wherein the time difference between the first rising edge time and the first transition time is greater than the round-trip time the light transmitted between the image sensing system and a target object.

For example, the first pixel circuit further includes a reset transistor, wherein the reset transistor is under the control of a reset signal and conducted during a reset time interval, wherein after the first reset time interval and before the first conduction time interval, the collecting signal generated by the control unit has the first high voltage level.

For example, after the first conduction time interval, the collecting signal generated by the control unit transits from the low voltage level into the first high voltage level.

For example, the first transmission signal has a first falling edge at a first falling edge time, and the collecting signal transits from the low voltage level into the first high voltage level at a second transition time, and the second transition time takes place after the first falling edge time.

For example, the first pixel circuit further includes a second transmission gate, under the control of a second transmission signal and conducted during a second conduction time interval; wherein, before the second conduction time interval, the collecting signal generated by the control unit has a first high voltage level; wherein, during the second conduction tune interval, the collecting signal generated by the control unit transits from the first high voltage level into a low voltage level.

For example, after the second conduction time interval, the collecting signal generated by the control unit transits from the low voltage level into the first high voltage level.

For example, the first pixel circuit outputs a first pixel output signal during a reading time interval, and during the reading time interval, the collecting signal generated by the control unit has a second high voltage level, wherein the second high voltage level is greater than the first high voltage level.

The present application also provides an electronic device, which includes an image sensing system, wherein the image sensing system includes a first pixel circuit that includes a photosensitive device, a first transmission gate that is under the control of a first transmission signal and conducted during a first conduction time interval, and a collection gate that is coupled between the photosensitive device and the transmission gate and configured to receive a collecting signal; and a control unit, coupled to the collection gate and configured to generate the collecting signal to the collection gate, wherein the collecting signal has a non-fixed voltage value.

The present application uses the timing of the collecting signal to expand the full well capacity of the photosensitive device; therefore, as the exposure time gets longer, the photosensitive device may store more photoelectrons, thereby enhancing the signal quality. As compared with prior art, the present application uses only a single set of pixel array that is capable of operate in both the general camera mode and the optical ranging mode, thereby achieving the advantage of lowering the manufacture cost.

BRIEF DESCRIPTION OF THE DRAWINGS

FIG. 7 according to embodiments of the present application a pixel circuit a schematic diagram of;

DETAILED DESCRIPTION

To further explain the purposes, technical solutions and advantages of the present application, the appended drawings and embodiments are discussed below to give a detailed description of the present invention. It should be noted that the embodiments provided herein are used to explain the present invention, and shall not be used to limit the present application.

Figure 1:
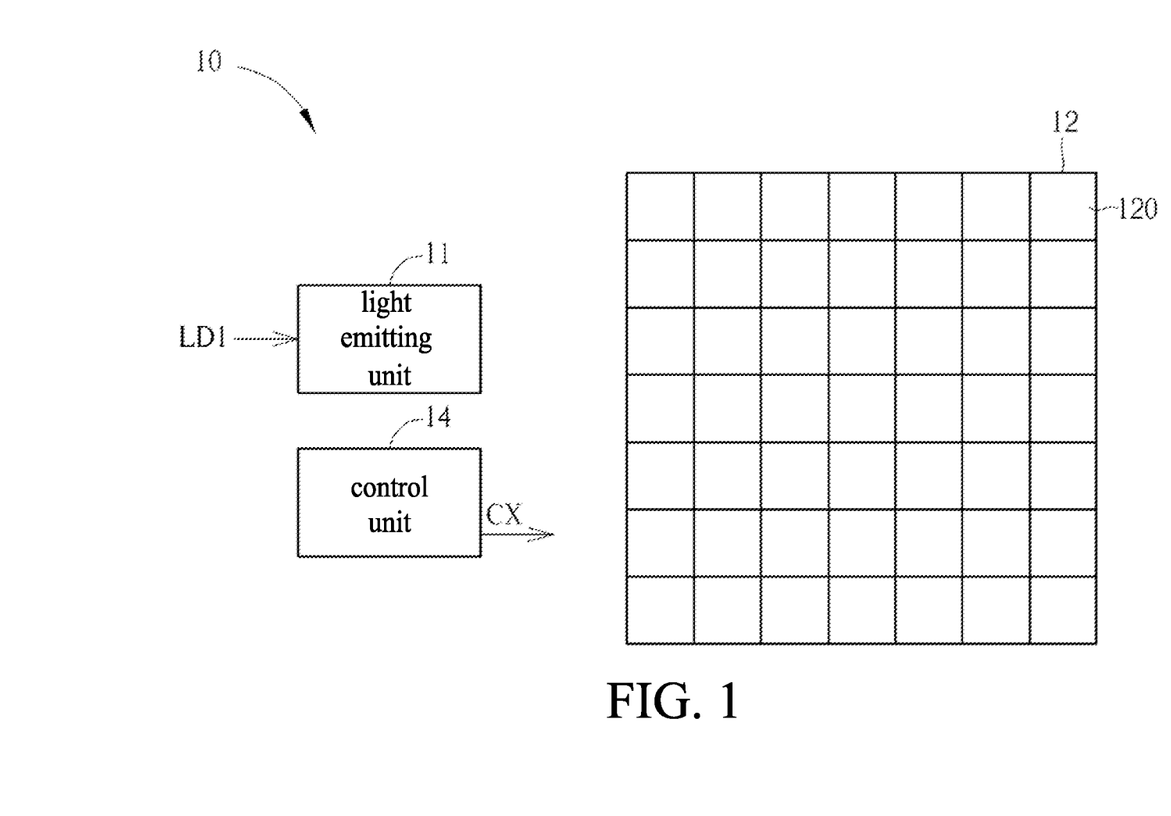
FIG. 1 is a schematic diagram of an image sensing system according to embodiments of the present application.
Figure 2:
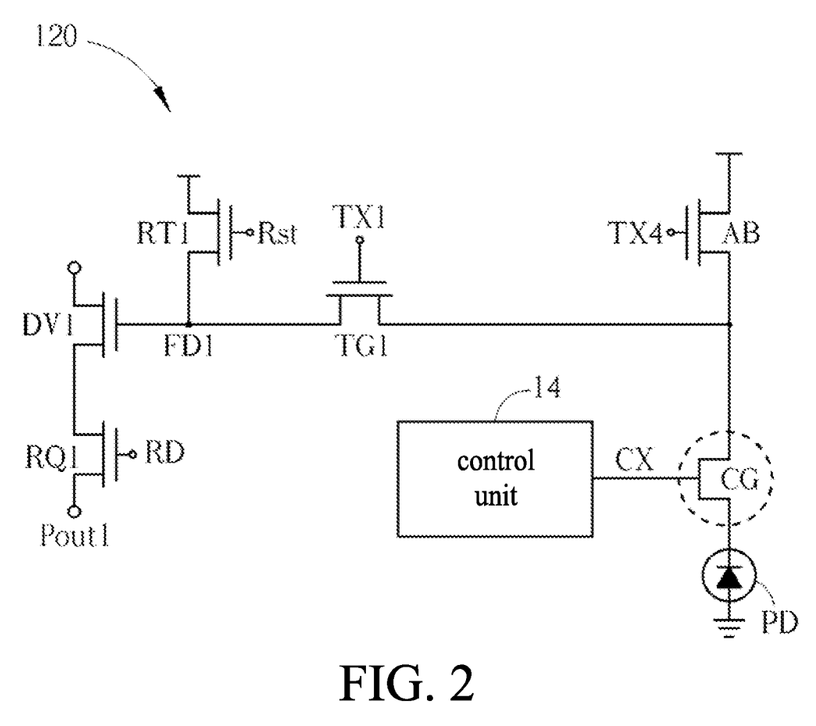
FIG. 2 is a schematic diagram of a pixel circuit according to embodiments of the present application.

Please refer to FIG. 1 and FIG. 2; FIG. 1 is a schematic diagram of an image sensing system 10 according to embodiments of the present application; FIG. 2 is a schematic diagram of a pixel circuit 120 according to embodiments of the present application. The image sensing system 10 may perform optical ranging and generate a general image (at the same time), wherein the optical ranging may use the structured light and trilateration method to perform the ranging, or use the time-of-flight principle to perform the ranging; the general image may be a color or black-and-white image generated by a general camera; that is, the image sensing system 10 may operate in an optical ranging mode or a general camera mode. As shown in FIG. 1, the image sensing system 10 includes a light emitting unit 11, a pixel array 12 and a control unit 14. The light emitting unit 11 is used to perform optical ranging, which can be a light-emitting diode (LED), such as an infrared ray (IR) light-emitting diode, and the light emitting unit 11 receives the light emitting signal LD1 and emits the incident light.

The pixel array 12 includes a plurality of pixel circuits 120 arranged in an array; as shown in FIG. 2, the pixel circuit 120 includes a photosensitive device PD, a transmission gate TG1, a collection gate CG, an output transistor DV1, a reading transistor RQ1, a reset transistor RT1 and an anti-blooming transistor AB. The photosensitive device PD is configured to receive illumination (including the reflective light corresponding to the incident light or the background light) and generate photoelectrons; the reset transistor RT1 receives (or is under the control of) a reset signal Rst and is conducted during a reset time interval TR. The transmission gate TG1 is under the control of the transmission signal TX1 and is conducted during the conduction time interval TC1, so as to drain the photoelectrons stored by the photosensitive device PD to a node FD1. The gate of the output transistor DV1 is coupled to the node FD1, and the reading transistor RQ1 is coupled to the output transistor DV1. The reading transistor RQ1 receives a reading signal RD, and outputs a pixel output signal Pout1 during a reading time interval TRD. The collection gate CG is coupled between the photosensitive device PD and the transmission gate TG1, the collection gate CG receives a collecting signal CX, and the collection gate CG and the collecting signal CX can form an electric field or electric potential energy at the photosensitive device PD, so as to store or clear photoelectrons in the photosensitive device PD, thereby improving the signal quality. The anti-blooming transistor AB is configured to drain the photoelectrons generated by the photosensitive device PD due to the receipt of the background light, so that is will not affect the normal operation of the circuit; the anti-blooming transistor AB receives a signal TX4. The control unit 14 is coupled to the collection gate CG of the pixel circuit 120 and configured to generate a collecting signal CX having a non-fixed voltage value to the collection gate CG.

Figure 3:
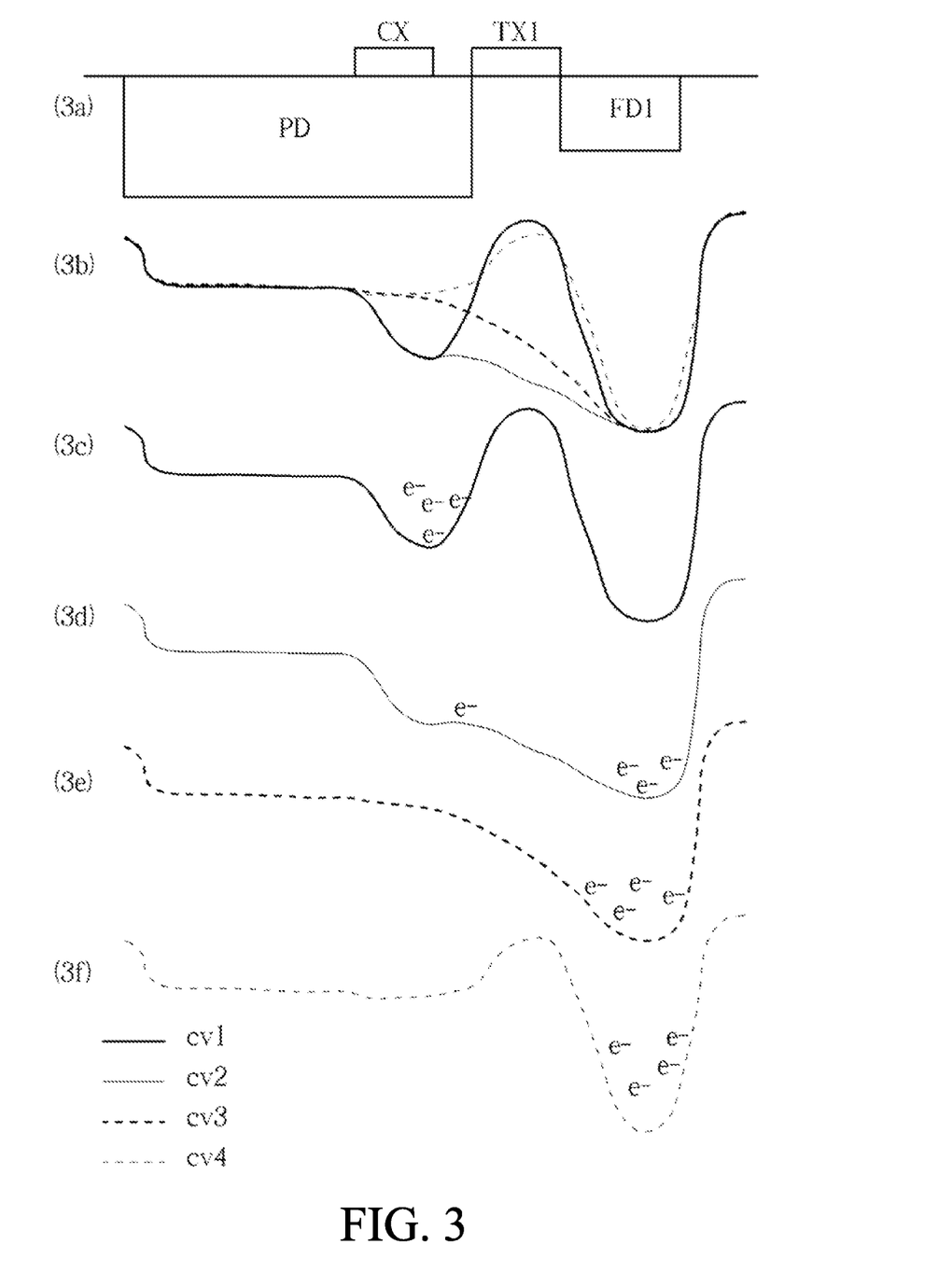
FIG. 3 is schematic cross-sectional view of a collection gate electrode according to embodiments of the present application.
Figure 4:
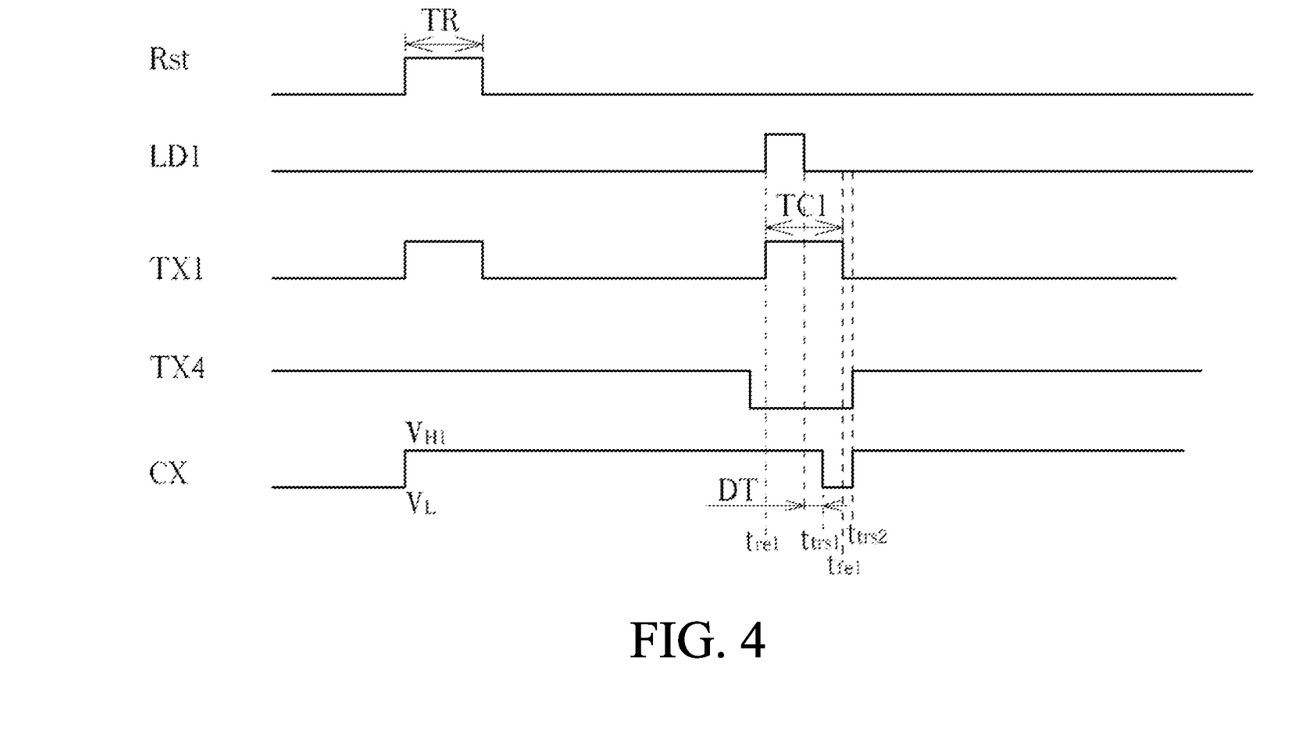
FIG. 4 is an oscillogram showing a plurality of signals according to embodiments of the present application.

More specifically, reference is also made to FIG. 3 and FIG. 4; FIG. 3 is a cross-sectional view of the photosensitive device PD, the transmission gate TG1 and the collection gate CG, and a schematic diagram of the electric field/electric potential energy formed therefrom; FIG. 4 is an oscillogram of the light emitting signal LD1, the reset signal Rst, the transmission signal TX1, the signal TX4 and the collecting signal CX when the image sensing system 10 operates in the optical ranging mode. As shown in FIG. 3, the transmission gate TG1 is a whole metal-oxide semiconductor field-effect transistor (MOSFET), and the collection gate CG is an electrode disposed above the photosensitive device PD and in adjacent to the transmission gate TG1 (and not a whole field-effect transistor), which can be considered as being coupled between the photosensitive device PD and the transmission gate TG1. In this case, the curve cv1 in FIG. 3 is illustrated as the electric potential energy formed by the pixel circuit 120 (the photosensitive device PD, the transmission gate TG1 and the collection gate CG) between the reset time interval TR and the rising edge time $t_{re1}$ of the transmission signal TX1; the curve cv2 is illustrated as the electric potential energy formed by the pixel circuit 120 between the rising edge time $t_{re1}$ and the transition time $t_{trs1}$ of the collecting signal CX; the curve cv3 is illustrated as the electric potential energy formed by the pixel circuit 120 between the transition time $t_{trs1}$ of the collecting signal CX and the falling edge time $t_{fe1}$ of the transmission signal TX1; the curve cv4 is illustrated as the electric potential energy formed by the pixel circuit 120 between the falling edge time $t_{fe1}$ and the transition time $t_{trs2}$ of the g signal CX. Moreover, frames 3c~3f in FIG. 3 show curves cv1~cv4, respectively, and the frame 3b in FIG. 3 shows the combined electric potential energy/curves cv1~cv4, so as to illustrate the relative relationship therebetween.

As shown in FIG. 4, before the operation of the pixel circuit 120 starts, the reset transistor RT1 is conducted during the reset time interval TR, and the collecting signal CX generated by the control unit 14 transits from the low voltage level $V_L$ into the high voltage level $V_{H1}$ during the reset time interval TR. After the reset time interval TR, the collecting signal CX generated by the control unit 14 keeps at the high voltage level $V_{H1}$ until the conduction time interval TC1 of the transmission gate TG1. During the conduction time interval TC1, the collecting signal CX generated by the control unit 14 transits from the high voltage level $V_{H1}$ into the low voltage level $V_L$. After the conduction time interval TC1 ends for a period of time, the collecting signal CX generated by the control unit 14 further transits from the low voltage level $V_L$ into the high voltage level $V_{H1}$. In one embodiment, the low voltage level $V_L$ may be 0.1 volts (V), and the high voltage level $V_{H1}$ may be about 1.8V. Furthermore, the collecting signal CX transits from high voltage level $V_{H1}$ into the low voltage level $V_L$ at the transition time $t_{trs1}$, and the collecting signal CX transits from the low voltage level $V_L$ into the high voltage level $V_{H1}$ at the transition time $t_{trs2}$; moreover, the transmission signal TX1 has a rising edge at the rising edge time $t_{re1}$ and has a falling edge at the falling edge tune $t_{fe1}$. The transition time $t_{trs1}$ of the collecting signal CX is within the conduction time interval TC1; i.e., the transition time $t_{trs1}$ is between the rising edge time $t_{re1}$ and the falling edge time $t_{fe1}$; the transition time $t_{trs2}$ is after the falling edge time $t_{re1}$; the transition time is later than the falling edge time $t_{fe1}$.

Between the reset time interval TR and the conduction time interval TC1, the electric potential energy of the pixel circuit 120 is as shown in the frames 3c (curve cv1) in FIG. 3; a greater electric potential energy barrier may be formed between the transmission gate TG1 and the collection gate CG so that photoelectrons cannot be transferred to the node FD1 easily, and therefore, it is feasible to store more photoelectrons. At the beginning of the conduction time interval TC1; i.e., at the time between the rising edge time $t_{re1}$ and the transition time $t_{trs1}$, the transmission signal TX1 has a high voltage level, and the electric potential energy of the pixel circuit 120 is as shown in the frame 3d (curve cv2); during this stage, some photoelectrons are transferred (drained) to the node FD1. At the later stage of the conduction time interval TC1; i.e., between the transition time $t_{trs1}$ and the falling edge time $t_{fe2}$, the collecting signal CX transits into the low voltage level $V_L$; the electric potential energy of the pixel circuit 120 is as shown in the frame 3e (curve cv3); during this stage, because the transmission signal TX1 has a high voltage level and the collecting signal CX has a low voltage level $V_L$, more of the photoelectrons stored in the photosensitive device PD can be transferred to the node FD1 more effectively. Between the falling edge time $t_{fe2}$ and the transition time $t_{trs2}$, the electric potential energy of the pixel circuit 120 is as shown in the frame 3f (curve cv4). After the transition time $t_{trs2}$, the collecting signal CX once again transits into the high voltage level $V_{H1}$, the electric potential energy of the pixel circuit 120 return to the original state, which is as shown in the frame 3c (curve cv1) in FIG. 3; at this stage, the transmission signal TX1 has a low voltage level, and a greater electric potential energy barrier is formed once again.

Preferably, there is a time difference DT between the falling edge time of the light emitting signal LD1 and the falling edge time of the collecting signal CX (i.e., transition time $t_{trs1}$); preferably, the time difference DT is greater than the round-trip time the last incident light emitted by the light emitting unit 11 and transmitted between the image sensing system 10 and the target object, which ensures that the reflective light may arrive at the image sensing system 10 before the collecting signal CX transits into the low voltage level $V_L$ (i.e., the transition time $t_{trs1}$).

Figure 5:
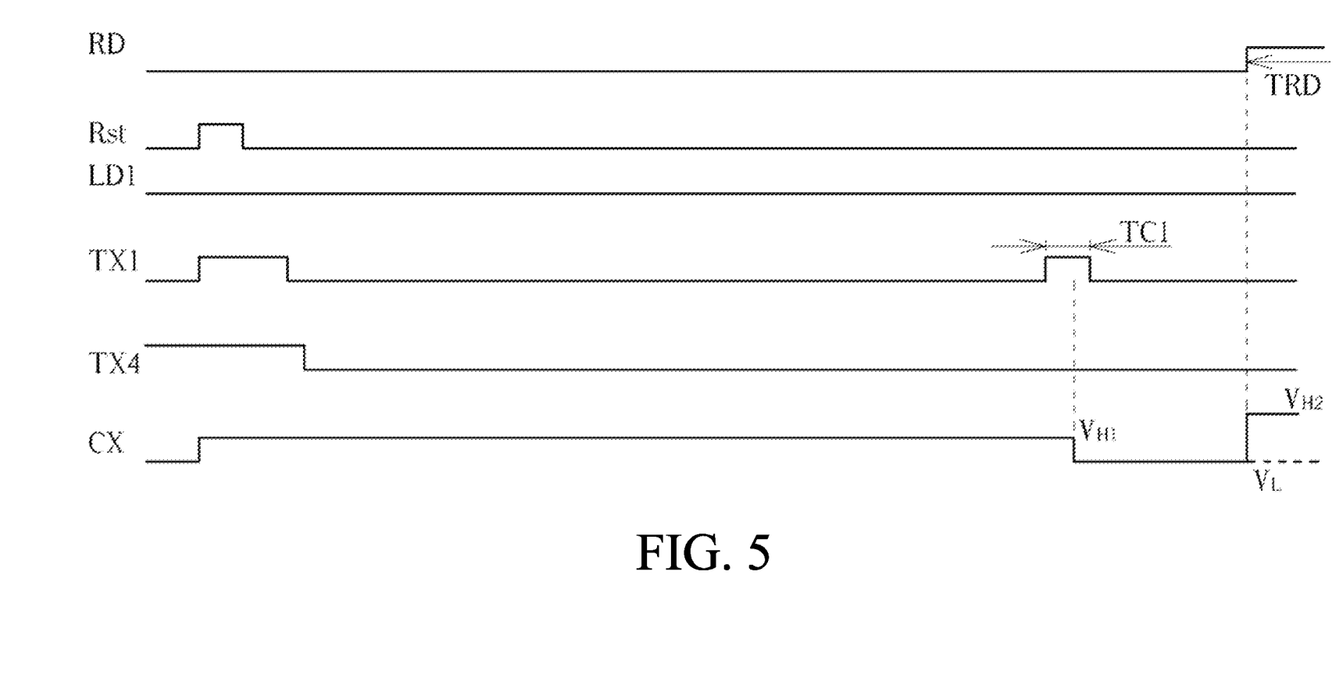
FIG. 5 is an oscillogram showing a plurality of signals according to embodiments of the present application.

Further, FIG. 5 is an oscillogram of the reading signal RD, the light emitting signal LD1, the reset signal Rst, the transmission signal TX1, the signal TX4 and the collecting signal CX when the image sensing system operate in the general camera mode. Similar to the timing shown in FIG. 4 (the optical ranging mode), in FIG. 5, the collecting signal CX has a high voltage level $V_{H1}$ between the reset time interval TR and the conduction time interval TC1 (i.e., during the exposure time), and the collecting signal CX transits from the high voltage level $V_{H1}$ into the low voltage level $V_L$ at the transition time $t_{trs1}$ of the conduction time interval TC1.

Different from the FIG. 4 (the optical ranging mode), in one embodiment, when the reading transistor RQ1 is conducted; that is, when the reading signal RD has a high voltage level, the voltage of the collecting signal CX is raised to another high voltage level $V_{H2}$, wherein the high voltage level $V_{H2}$ is greater than the high voltage level $V_{H1}$; tier example, the high voltage level $V_{H2}$ may be double of the high voltage level $V_{H1}$ ($V_{H2}=2*V_{H1}$). In other words, during the reading time interval TRD, the electric potential energy of the high voltage level $V_{H2}$ formed at the collection gate CG is even higher; at this stage, a greater electric potential energy barrier is formed between the transmission gate TG1 and the collection gate CG so that it is more difficult for the photoelectrons to be transferred to the node FD1, and hence it will not affect the output signal. Moreover, the signal TX4 configured to control the anti-blooming transistor AB tends to be raised to the high voltage level during the reading time interval TRD, so as to drain the photoelectrons of the photosensitive device PD during the reading time interval TRD, and therefore it will not affect the normal operation of the circuit. In another embodiment, when the reading transistor RQ1 is conducted, the voltage of the collecting signal CX may be kept at a low voltage level $V_L$, as shown by the dotted-line in FIG. 5, which illustrates the collecting signal CX during the reading time interval TRD; and these implementations also satisfy the claims of the present application and fall within the scope of the present application.

When performing optical ranging, the incident light emitted by the light emitting unit is short pulsed light, and in order to successfully drain the photoelectrons corresponding to the short pulsed light, the collecting signal of the collection gate in current pixel circuits normally has a fixed voltage (e.g., 0.1 v). However, when the collecting signal has a fixed voltage, the full well capacity of the photosensitive device of existing pixel circuits is low, which is disadvantageous to long exposure time; that is, when the exposure tune of the existing pixel circuit applied in ranging is a little bit longer, the photoelectrons of the photosensitive device (the existing one applied in optical ranging) will overfill very quickly, and therefore affect the signal quality of general images; hence, the current pixel circuits applied in optical ranging is not suitable for the general camera mode operation, and therefore, the current electronic device needs a set of pixel array operates in the general camera mode and another set of pixel array operates in the optical ranging mode, which result in an increase in the manufacturing cost.

In comparison, the present invention gives the collecting signal CX a suitable timing, so that when the image sensing system 10 operates in the general camera mode, the electric potential energy barrier formed between the collection gate CG and the transmission gate TG1 is great enough to expand the full well capacity of the photosensitive device PD, and when the exposure time gets longer, the photosensitive device PD may store more photoelectrons, thereby enhancing the signal quality of the general camera mode. As compared with the prior art, the present application uses only a single set of pixel array 12 that is capable of operate in both the general camera mode and the optical ranging mode, thereby achieving the advantage of lowering the manufacture cost.

Figure 6:
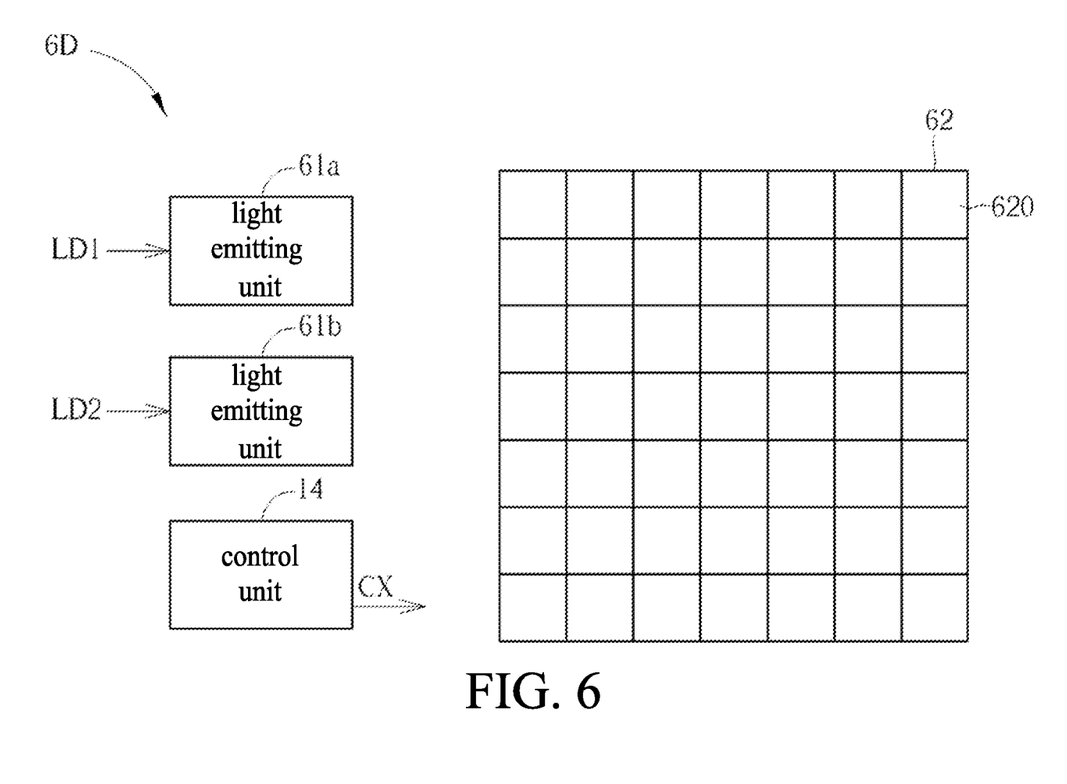
FIG. 6 is a schematic diagram of an image sensing system according to embodiments of the present application.
Figure 7:
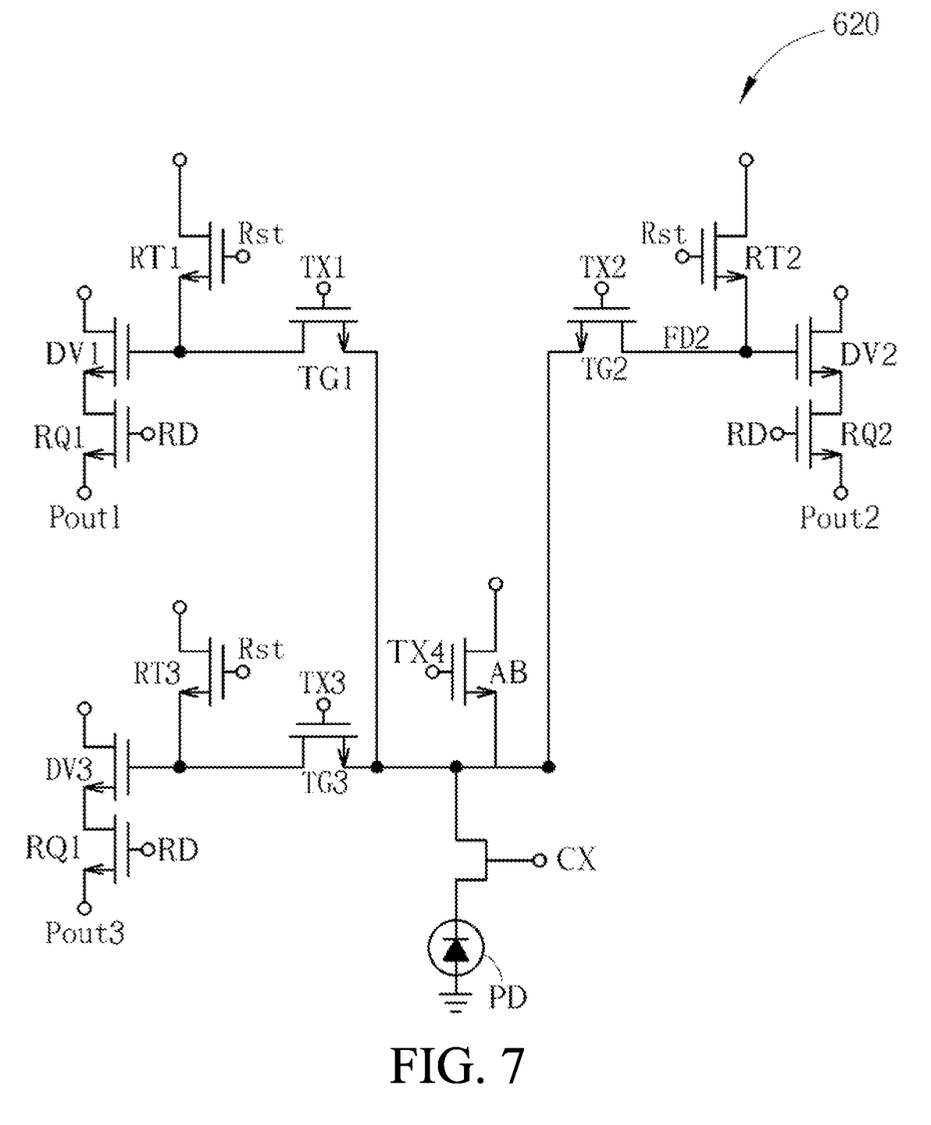

It should be noted that the foregoing embodiments are only used to illustrate the concept of the invention of the present application, and persons having ordinary skill in the art can made various modifications thereto, and the present invention is not limited thereto. For example, reference is made to both FIG. 6 and FIG. 7; FIG. 6 is a schematic diagram of an image sensing system 60 according to embodiments of the present application; FIG. 7 is a schematic diagram of a pixel circuit 620 according to embodiments of the present application. The image sensing system 60 is similar to the image sensing system 10, and it differs from the image sensing system 10 in that the image sensing system 60 includes two light emitting units 61a, 61b and a pixel array 62, wherein the light emitting units 61a, 61b respectively receive light emitting signals LD1, LD2 and emits the incident light at different times. Furthermore, the pixel array 62 includes a plurality of pixel circuits 620 arranged in an array, as shown in FIG. 7; as compared with the pixel circuit 120 of FIG. 2, the pixel circuit 620 further includes transmission gates TG2, TG3, output transistors DV2, DV3, reading transistors RQ2, RQ3 and reset transistors RT2, RT3. In this case, the reading transistors RQ2, RQ3 receive a reading signal RD and respectively output pixel output signals Pout2, Pout3 during the reading time interval TRD; the reset transistors RT2, RT3 receive a reset signal Rst and is conducted during the reset time interval TR. Moreover, the transmission gates TG2, TG3 respectively receive transmission signals TX2, TX3.

Figure 8:
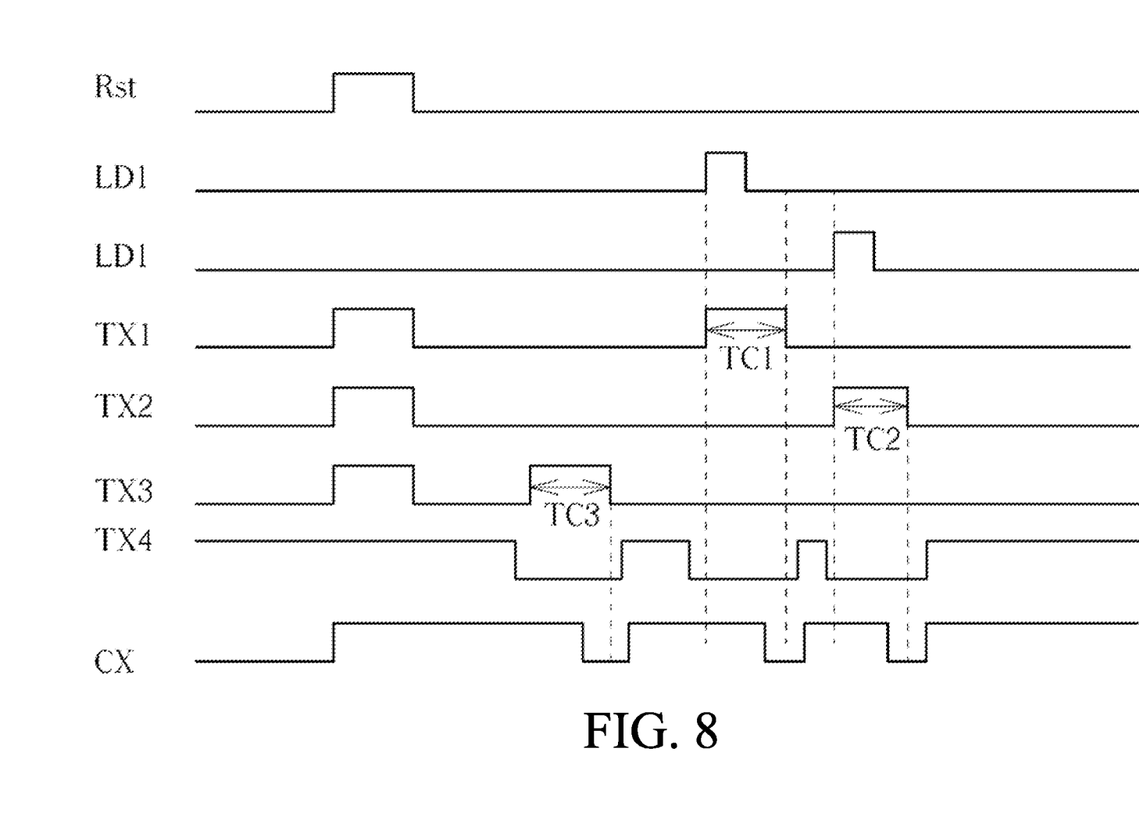
FIG. 8 is an oscillogram showing a plurality of signals according to embodiments of the present application.
Figure 9:
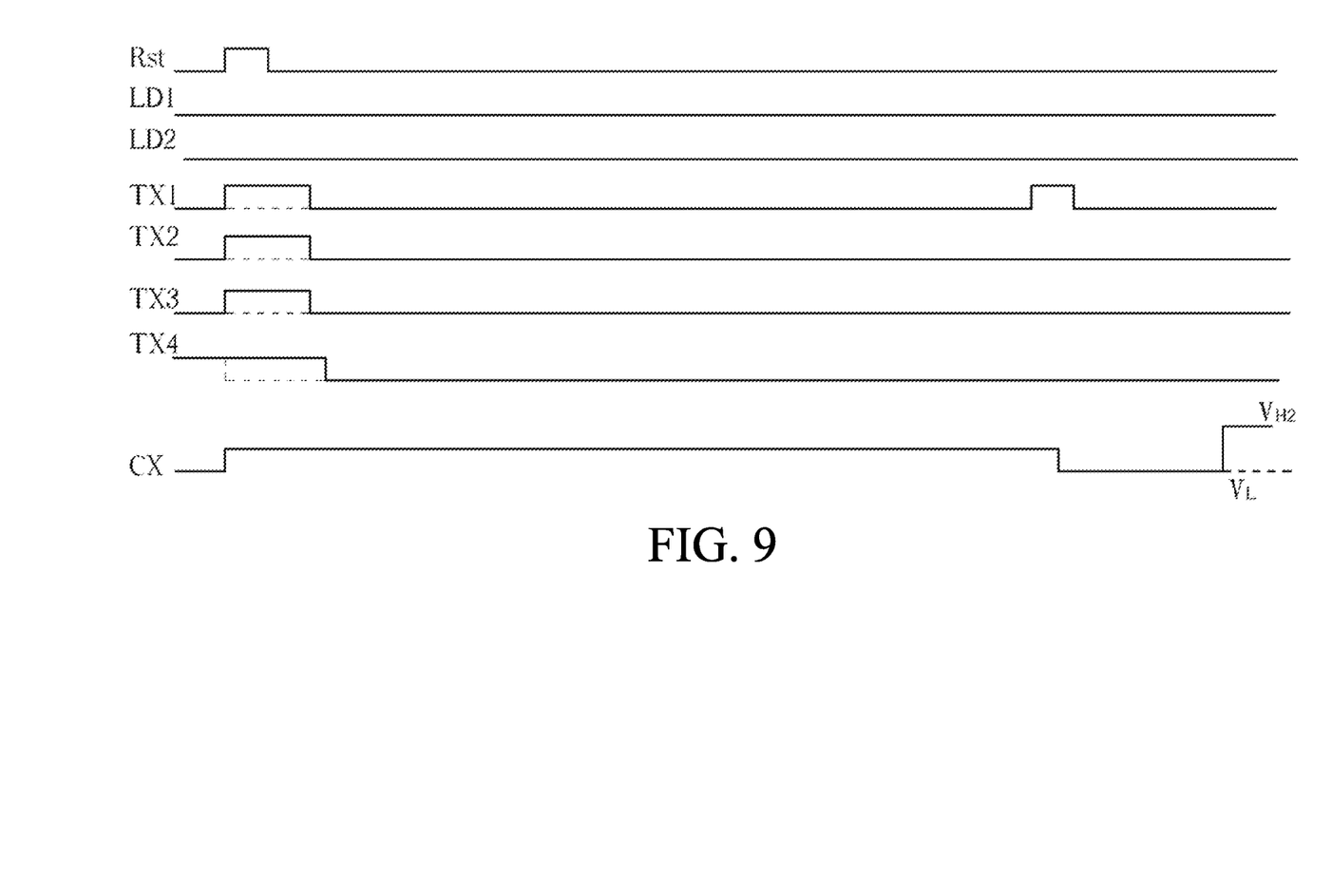
FIG. 9 is an oscillogram showing a plurality of signals according to embodiments of the present application.

With respect to the operation of the image sensing system 60, reference is made to FIG. 8 and FIG. 9; FIG. 8 and FIG. 9 are respectively the timing diagram when the image sensing system 60 operates in the optical ranging mode and general camera mode. During the optical ranging mode, as shown in FIG. 8, the transmission gates TG1, TG2 are respectively conducted during the conduction time intervals TC1, TC2; the light emitting units 61a, 61b respectively emit light during the conduction time intervals TC1, TC2. During the conduction time intervals TC1, TC2, the photosensitive device PD respectively receive the reflected light corresponding to light emitting units 61a, 61b. The transmission gate TG3 is conducted during the conduction time interval TC3, during which period, none of the light emitting unit 61a, 61b emits light, and during the conduction time interval TC3, the photosensitive device PD receives the background light. The signal TX4 configured to control the anti-blooming transistor AB has a low voltage level during the conduction time intervals TC1, TC2, TC3 and has a high voltage level during most of the remainder time. Similarly, during the conduction time interval TC1, TC2, TC3, the collecting signal CX transits from the high voltage level $V_{H1}$ into the low voltage level $V_L$. After the conduction time intervals TC1, TC2, TC3 end for a period of time, the collecting signal CX transits from the low voltage level $V_L$ into the high voltage level $V_{H1}$.

Similarly, during the general camera mode, the collecting signal CX in FIG. 9 has a high voltage level $V_{H1}$ between the reset time interval TR and the conduction time interval TC1 (i.e., during the exposure time), and the collecting signal CX transits from the high voltage level $V_L$ into the low voltage level $V_L$ at the transition time $t_{trs1}$ of the conduction time interval TC1. For the rest of the details, please refer to the relevant paragraphs above, and a repeated description is omitted herein.

Figure 10:
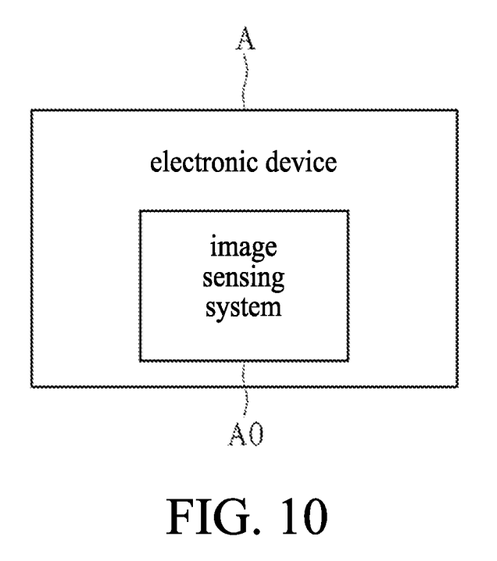
FIG. 10 is a schematic diagram of an electronic device according to embodiments of the present application.

Moreover, the present image sensing system can be disposed in an electronic device such as the mobile phone or table computer. Reference is made to FIG. 10; FIG. 10 is a schematic diagram of an electronic device A according to embodiments of the present application. The electronic device A includes an image sensing system A0, wherein the image sensing system A0 may be implemented using the image sensing system 10 or the image sensing system 60.

In view of the foregoing, the present application uses the timing of the collecting signal to expand the full well capacity of the photosensitive device; therefore, as the exposure time gets longer, the photosensitive device may store more photoelectrons, thereby enhancing the signal quality. As compared with prior art, the present application uses only a single set of pixel array that is capable of operate in both the general camera mode and the optical ranging mode, thereby achieving the advantage of lowering the manufacture cost.

The foregoing outlines a portion of embodiments of the present disclosure, and shall not be used to limit the present application; any modification, equivalent substitution or improvement made within the spirits and principles of the present application shall be included in the scope of protection of the present application.

What is claimed is:

1. An image sensing system, comprising,
   a first pixel circuit, comprising:
   a photosensitive device;
   a first transmission gate, under the control of a first transmission signal and conducted during a first conduction time interval; and
   a collection gate, disposed above the photosensitive device and configured to receive a collecting signal; and
   a control unit, coupled to the collection gate and configured to generate the collecting signal to the collection gate, wherein when the image sensing system operates in an optical ranging mode, the collecting signal transits between a first high voltage level and a low voltage level, when the image sensing system operates in a general camera mode, the collecting signal transits between a second high voltage level and the low voltage level, wherein the second high voltage level is higher than the first high voltage level.

2. The image sensing system of claim 1, wherein when the image sensing system operates in the optical ranging mode, before the first conduction time interval, the collecting signal generated by the control unit has the first high voltage level, and during the first conduction time interval, the collecting signal generated by the control unit transits from the first high voltage level into the low voltage level.

3. The image sensing system of claim 2, wherein the first transmission signal has a first rising edge at a first rising edge time, and the collecting signal transits from the first high voltage level into the low voltage level at first transition time, wherein the time difference between the first rising edge time and the first transition time is greater than the round-trip time the light transmitted between the image sensing system and a target object.

4. The image sensing system of claim 2, wherein the first pixel circuit further comprises a reset transistor, wherein the reset transistor is under the control of a reset signal and conducted during a reset time interval, wherein after the first reset time interval and before the first conduction time interval, the collecting signal generated by the control unit has the first high voltage level.

5. The image sensing system of claim 2, wherein after the first conduction time interval, the collecting signal generated by the control unit transits from the low voltage level into the first high voltage level.

6. The image sensing system of claim 5, wherein the first transmission signal has a first falling edge at a first falling edge time, and the collecting signal transits from the low voltage level into the first high voltage level at a second transition time, and the second transition time takes place after the first falling edge time.

7. The image sensing system of claim 1, wherein the first pixel circuit further comprises:
a second transmission gate, under the control of a second transmission signal and conducted during a second conduction time interval;
wherein, before the second conduction time interval, the collecting signal generated by the control unit has a first high voltage level;
wherein, during the second conduction time interval, the collecting signal generated by the control unit transits from the first high voltage level into a low voltage level.

8. The image sensing system of claim 7, wherein after the second conduction time interval, the collecting signal generated by the control unit transits from the low voltage level into the first high voltage level.

9. The image sensing system of claim 1, wherein when the image sensing system operates in the general camera mode, the first pixel circuit outputs a first pixel output signal during a reading time interval, and during the reading time interval, the collecting signal generated by the control unit has the second high voltage level.

10. An electronic device, comprising an image sensing system, wherein the image sensing system comprises:
a first pixel circuit, comprising:
a photosensitive device;
a first transmission gate, under the control of a first transmission signal and conducted during a first conduction time interval; and
a collection gate, disposed above the photosensitive device and configured to receive a collecting signal; and
a control unit, coupled to the collection gate and configured to generate the collecting signal to the collection gate, wherein when the image sensing system operates in an optical ranging mode, the collecting signal transits between a first high voltage level and a low voltage level, when the image sensing system operates in a general camera mode, the collecting signal transits between a second high voltage level and the low voltage level, wherein the second high voltage level is higher than the first high voltage level.

11. The electronic device of claim 10, wherein when the image sensing system operates in the optical ranging mode, before the first conduction time interval, the collecting signal generated by the control unit has the first high voltage level, and during the first conduction time interval, the collecting signal generated by the control unit transits from the first high voltage level into the low voltage level.

12. The electronic device of claim 11, wherein the first transmission signal has a first rising edge at a first rising edge time, and the collecting signal transits from the first high voltage level into the low voltage level at first transition time, wherein the time difference between the first rising edge time and the first transition time is greater than the round-trip time the light transmitted between the image sensing system and a target object.

13. The electronic device of claim 11, wherein the first pixel circuit further comprises a reset transistor, wherein the reset transistor is under the control of a reset signal and conducted during a reset time interval, wherein after the first reset time interval and before the first conduction time interval, the collecting signal generated by the control unit has the first high voltage level.

14. The electronic device of claim 11, wherein after the first conduction time interval, the collecting signal generated by the control unit transits from the low voltage level into the first high voltage level.

15. The electronic device of claim 14, wherein the first transmission signal has a first falling edge at a first falling edge time, and the collecting signal transits from the low voltage level into the first high voltage level at a second transition time, and the second transition time takes place after the first falling edge time.

16. The electronic device of claim 10, wherein the first pixel circuit further comprises:
a second transmission gate, under the control of a second transmission signal and conducted during a second conduction time interval;
wherein, before the second conduction time interval, the collecting signal generated by the control unit has a first high voltage level;
wherein, during the second conduction time interval, the collecting signal generated by the control unit transits from the first high voltage level into a low voltage level.

17. The electronic device of claim 16, wherein after the second conduction time interval, the collecting signal generated by the control unit transits from the low voltage level into the first high voltage level.

18. The electronic device of claim 10, wherein when the image sensing system operates in the general camera mode, the first pixel circuit outputs a first pixel output signal during a reading time interval, and during the reading time interval, the collecting signal generated by the control unit has the second high voltage level.

* * * * *